Aug. 5, 1958     G. M. MAZEFFA ET AL     2,845,794
MULTI-PURPOSE TEST FIXTURE ASSEMBLY
Filed Sept. 29, 1955
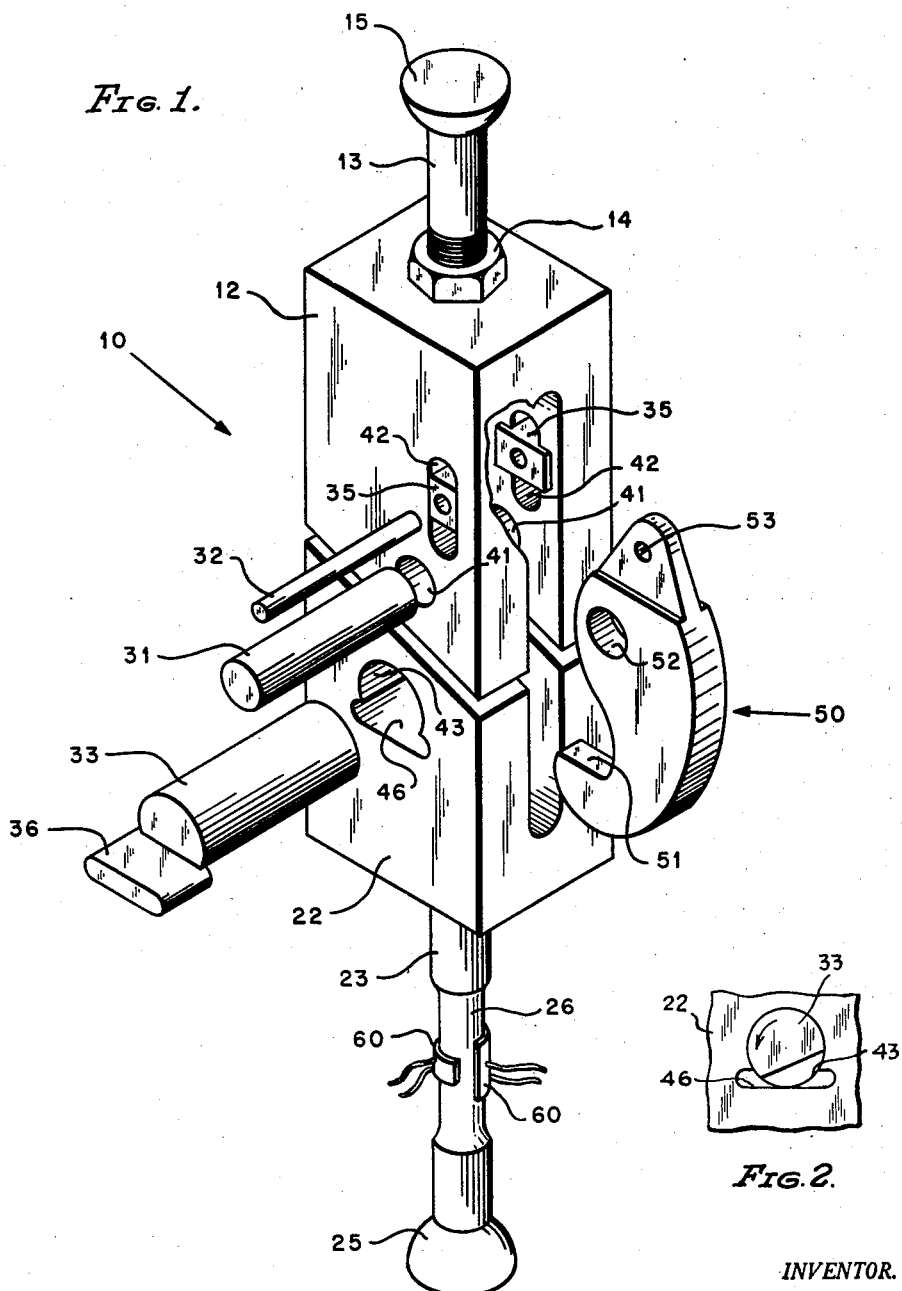
INVENTOR.
CARL A. DAMM
BY GEORGE M. MAZEFFA
ATTORNEYS

United States Patent Office 2,845,794
Patented Aug. 5, 1958

2,845,794
MULTI-PURPOSE TEST FIXTURE ASSEMBLY
George M. Mazeffa, Chalfont, and Carl A. Damm,
Upper Black Eddy, Pa.
Application September 29, 1955, Serial No. 537,595
5 Claims. (Cl. 73—88)
(Granted under Title 35, U. S. Code (1952), sec. 266)

The invention described herein may be manufactured and used by or for the Government of the United States of America for governmental purposes without the payment of any royalties thereon or therefor.

The present invention relates to a multi-purpose test fixture assembly, and more particularly to a multi-purpose test fixture assembly readily adaptable for pre-stressing, tensile testing, and fatigue testing of standardized test specimens in large quantities, with results which can be duplicated by other individuals using different types of testing machines without requiring the specialized services of highly trained personnel.

Certain types of test specimens are customarily subjected to several types of tests which must be carefully correlated to be of optimum value in evaluating the test specimen concerned. For example, in the case of the bomb hooks incorporated in bomb shackles for use in aircraft, three types of tests are required in the course of a comprehensive test procedure. Following existing procedures, three different types of fixtures are used for pre-stressing, tensile testing, and fatigue testing. In addition, these different types of fixtures are used in three different setups with a consequent introduction of variables which makes correlation of the results obtained very difficult. Furthermore, these variables and certain inherent limiting characteristics of the existing fixtures may introduce numerous errors due to various causes which reduce the accuracy and hence the value of the results obtained in these tests.

The present invention contemplates an improved test fixture assembly offering numerous advantages over existing fixtures including provisions for self-alignment which will compensate for any setup or dimensional discrepancies, means for directly recording the load applied during fatigue tests without calibrating the fatigue testing machine for each setup as required with existing fixtures, and readily removable means for converting this improved fixture assembly from a configuration suitable for fatigue testing to a configuration suitable for tensile testing or pre-stressing specimens.

An object of this invention is the provision of a multi-purpose test fixture assembly useful for subjecting test specimens to various types of tests.

Another object is to provide a multi-purpose test fixture assembly capable of self-alignment when installed in various types of test machines.

Still another object is the provision of a multi-purpose test fixture assembly including means for providing a direct indication of the loads applied thereto by any type of testing machine.

A final object of this invention is to provide means for changing a multi-purpose test fixture assembly readily from one configuration suitable for fatigue testing to another configuration suitable for tensile testing.

Other objects and many of the attendant advantages of this invention will be readily appreciated as the same becomes better understood by reference to the following detailed description when considered in connection with the accompanying drawing which comprises an exploded view, partially broken away, of a preferred embodiment of the instant invention, wherein:

Fig. 1 is an isometric view of the preferred embodiment of the instant invention with certain elements shown displaced from their operable positions, and Fig. 2 is a detailed side elevation of a portion of the lower fixture 22 showing the relationship between the pin 33 and the openings 43.

Referring next to the drawing, wherein like reference numerals designate like or corresponding parts, the multi-purpose fixture assembly generally designated by the reference numeral 10 in Fig. 1 includes an upper fixture 12 secured to an upper attaching stud 13 threadably engaged therewith and secured by a lock nut 14, and a lower fixture 22 attached to an elongated lower attaching stud 23 threadably engaged therewith and secured by a second lock nut, not shown. The respective studs 13 and 23 terminate at their outermost ends in enlarged spherical segments 15 and 25, respectively, forming bearing surfaces by means of which the fixture assembly is attached to a testing machine with the fixtures 12 and 22 continuously in alignment when a load is applied to a test specimen interconnecting the respective fixtures. The part generally designated by the reference numeral 50 is a representation of a conventional bomb hook including a hook portion 51 at its lower end and openings 52 and 53 therethrough to receive suitable mounting means therefor. A test specimen such as the bomb hook 50 may be secured in the central slots of the respective fixtures 12 and 22 by a cylindrical pivot pin 31 and an anchor pin 32 inserted in suitable openings 41 and 42, respectively, in the fixture 12 and extending through the openings 52 and 53, respectively, of the bomb hook 50, and by a generally cylindrical contoured pin 33 inserted in suitably sized circular openings 43 in fixture 22 and shaped to engage the face of the hook portion 51 of the bomb hook 50. It will be noted that the openings 42 in the fixture 12 are preferably elongated to provide a dimensional tolerance between the opening 52 and opening 53 in the bomb hook 50. In fact, the elongated openings 42 may be made large enough to accommodate sliding spacer and bearing blocks 35, as shown in the drawing, in which case the pin 32 fits through the openings provided therefor in the blocks 35. For fatigue tests, it is desirable that the contoured pin 33 be freely rotatable in openings 43 through the fixture 22, but for tensile tests it is desirable to immobilize pin 33 and this is readily accomplished by the insertion of a key 36 in the keyway 46 intersecting and forming an enlargement of the opening 43 through at least one side of the fixture 22 and engaging a suitable flat adjacent one end of pin 33. Finally, the elongated lower attaching stud 23 is provided with a necked-down portion 26 corresponding to a standard round tensile test specimen which may conveniently be fitted with strain gauges 60, as shown in the drawing, for direct measurement of the loading applied to the specimen. In addition, this provision for measuring the load applied at the center of the mating surfaces of the hook portion 51 of a bomb hook 50 and the contoured portion of the pin 33 which simulates a bomb lug eliminates the difficulties presently encountered in attempting to obtain consistent and accurate measurements of the loading applied to the various specimens by applying strain gauges to the asymmetrical body comprising the lower fixture 22.

The contoured pin 33 may be generally cylindrical with a flattened central portion precisely shaped to correspond to the portion of the surface of a bomb lug which engages a bomb hook. This configuration is described and illustrated in co-pending application Serial No. 471,931 of Carl A. Damm and William Paraskewik, filed November 29, 1954, now Patent No. 2,812,658. Alternatively, the pin 33 may be shaped as shown in the drawing herewith, with a flat extending the entire length of the pin 33. This flat preferably approximates the portion of a bomb lug which engages a bomb hook and at least a central portion intermediate its ends must be precisely shaped to accurately simulate the critical portion of the surface of a bomb lug. In either case, a section adjacent one end of pin 33 must be provided with a flat for engagement with the key 36. The same pin 33 may be used for tensile tests with the key 36 and for fatigue tests without the key 36. However, for pre-stressing, the pin 33 must be replaced with a pin having a modified contour of the mating surface, since effective pre-stressing of a bomb hook 50 requires that the pin work harden the surface of hook portion 51 in a particular manner.

In operation, the test fixture assembly 10, including the upper fixture 12 and the lower fixture 22, is installed in a suitable testing machine with a test specimen such as a bomb hook 50 interconnecting the upper fixture 12 and the lower fixture 22 by engagement with mounting pins 31 and 32 and contoured pin 33. When a bomb hook is being pre-stressed, the strength of the hook 50 is increased in critical areas and particularly on the mating surface of the hook portion 51 by local cold working of the metal composing the hook. For tensile testing, contoured pin 33 is used with key 36, so that tension load may be applied to the hook by the testing machine without rotation of the pin 33. For fatigue testing, the key 36 is removed so that the pin 33 becomes freely rotatable in the circular openings 43 through the lower fixture 22. With this arrangement, the pin 33 is permitted to rotate with the hook portion 51 of a bomb hook 50 as it deflects in response to cyclic fatigue loading.

Thus, the instant invention provides a multi-purpose test fixture assembly automatically self-aligning in any testing machine upon which it is mounted, so that it compensates for any setup or dimensional discrepancies. In addition, the instant invention provides a multi-purpose fixture assembly suitable for accurately subjecting large quantities of given test specimens to various types of tests. For example, tensile tests conducted using this test fixture assembly no longer require a special tensile testing fixture or a tensile testing machine. Instead, a simple and inexpensive setup can be substituted in which the load is applied by means of a hydraulic jack or a simple jack screw. Hence, the multi-purpose test fixture assembly characterizing the instant invention may be used to perform tests at locations in which a tensile testing machine is not available.

The fixtures 12 and 22, as illustrated, may conveniently be made from a single block of material and then be cut to form the separate upper and lower fixtures illustrated by cutting the block in half, thus simplifying fabrication by keeping machining operations at a minimum. Alternatively, the respective fixtures may be of built-up construction fabricated by welding or riveting component parts or they may be assembled by using bolts or similar removable fastening devices permitting disassembly of the fixture to facilitate removal of the parts of broken pins in the event of pin breakage. In any case, the attaching studs may be made readily detachable as shown in the drawing for use with various different fixtures.

Obviously, many modifications and variations of the present invention are possible in the light of the above teachings. It is, therefore, to be understood that within the scope of the appended claims the invention may be practiced otherwise than as specifically described.

What is claimed is:

1. A self-aligning multi-purpose fixture assembly for loading of asymmetrical specimens, comprising first and second cooperating fixture members each attached to an elongated supporting means having an enlarged end portion with a spherical bearing face thereon for transmitting loads to said fixture members, readily removable attachment means engaging said first fixture member to fixedly secure a specimen thereto, readily removable specimen engaging means rotatably mounted within said second fixture member, and removable locking means mounted upon said second fixture member for engagement with said specimen engaging means for selectively restraining said specimen engaging means from rotation within said second fixture member.

2. A self-aligning multi-purpose fixture assembly for loading of asymmetrical specimens, comprising first and second cooperating fixture members each attached to an elongated supporting means having an enlarged end portion with a spherical bearing face thereon transmitting loads to said fixture members, one of said supporting means including means for directly sensing said load applied to said fixture members, readily removable attachment means engaging said first fixture member to fixedly secure a specimen thereto, readily removable specimen engaging means rotatably mounted within said second fixture member, and means for permitting selective restraint of said specimen engaging means from rotation within said second fixture member.

3. A universally adaptable multi-purpose fixture assembly for the loading of a hook member, comprising a pair of cooperating fixture members each supported for such loading by a self-aligning supporting means attached thereto, at least two readily removable mounting pins inserted in spaced transverse openings through one of said fixture members to fixedly support said hook member, a generally cylindrical pin with a contoured hook engaging surface intermediate its ends rotatably mounted in a transverse opening through the other of said fixture members so that its contoured surface engages and mates with the hook portion of said hook member, and removable locking means for selectively restraining said rotatably mounted pin against rotation.

4. A self-aligning multi-purpose fixture assembly for loading asymmetrical specimens, comprising, in combination, first and second cooperating fixture members each attached to an elongated supporting means having an enlarged end portion with a spherical bearing face thereon for transmitting loads to said fixture members, readily removable attachment means within said first fixture member to secure fixedly a specimen thereto, readily removable specimen engaging means rotatably mounted within said second fixture member, and removable locking means mounted upon said second fixture member for engagement with said specimen engaging means for selectively restraining said specimen engaging means from rotation within said second fixture member, and a continuous slotted opening through one common face of said cooperating members defined by said first and second cooperating fixture members for permitting ready insertion of said specimen for loading while said members remain in cooperative relationship.

5. A universally adaptable multi-purpose fixture assembly for the loading of a hook member, comprising, in combination, a pair of cooperating fixture members each supported for such loading by a self-aligning supporting means attached thereto, said members when assembled for cooperative relationship having a common face with a slotted opening for permitting insertion of said hook member, at least two readily removable mounting pins inserted in spaced transverse openings through one of said fixture members to fixedly support said hook member when inserted in said slotted opening, a generally cylindrical pin with a contoured hook engaging surface intermediate its ends rotatably mounted in a transverse opening through the other of said fixture members and arranged so that its contoured surface engages and mates with the hook portion of said inserted hook member, and removable locking means for selectively restraining said rotatably mounted pin against rotation.

References Cited in the file of this patent

UNITED STATES PATENTS

| 2,414,161 | Moore | Jan. 14, 1947 |

FOREIGN PATENTS

| 732,700 | Germany | Mar. 10, 1943 |
| 678,003 | Great Britain | Aug. 27, 1952 |